Patented Feb. 23, 1937

2,071,511

UNITED STATES PATENT OFFICE 2,071,511

ENTERIC COATING

Frank R. Eldred, Mount Tabor, N. J., assignor to Reed & Carnrick, Jersey City, N. J., a corporation of New Jersey No Drawing. Application October 1, 1934, Serial No. 746,414

6 Claims. (Cl. 167—82)

This invention relates to a new and useful improvement in enteric coatings for pills, tablets or other medicinal products which are intended for oral administration and which it is desired should be carried through the stomach and into the intestinal tract before their activity takes place.

The function of an enteric coating is to pass the pill, tablet or other medicinal product contained therein through the stomach and into the intestines before the enteric coating is broken up and the medicine of the tablet made available and in general enteric coatings are made of materials which are insoluble in the dilute acids contained in the stomach but which are soluble or disintegrated by the slightly alkaline fluids of the intestinal tract.

Most of the enteric coatings heretofore used are objectionable either for the reason that they imperfectly perform their function of carrying the tablet through the stomach or because they introduce undesirable physiological reactions themselves. As for example one of the most effective coatings for carrying a tablet through the stomach for disintegration in the intestinal tract is salol, that is phenyl salicylate. Salol is, however, physiologically active and it is not always desirable to give salol when administering some other form of physiologically active material. Most of the other materials heretofore used for enteric coatings either fail to carry the material through the stomach or if the tablet does pass through the stomach unchanged, it fails to disintegrate readily in the intestinal tract.

The object of my present invention is therefore to provide an enteric coating which is free from these objections and which will accomplish its desired purpose without inducing undesirable physiological effects in the patient.

The principal component of the enteric coating which I have produced is abietic acid which forms readily soluble sodium salts in the intestinal tract but which in the form of a coating on a pill, tablet or the like, will pass through the acid content of the stomach substantially unchanged. In order to prevent disintegration of the coating during periods of storage of the tablets, pills or the like, such as on the druggists' shelf, through drying out or other causes because of hardening and cracking of the abietic acid coating, I add a plasticizer, such as oleic acid or other fatty acid, which is also resistant to the acids of the stomach and yet form readily soluble sodium salts in the intestinal tract, and benzoic acid, as well as a small amount of an ester of abietic acid to act as a plasticizer.

The enteric coating so formed is insoluble in water and acids and will therefore readily pass through the stomach, but inasmuch as it is composed almost entirely of mild acids, it will dissolve in the slightly alkaline fluids of the intestinal tract forming soluble sodium salts which pass through the intestines without appreciable physiological activity and at the same time release the medicinal contents of the pill or tablet which has been provided with the coating.

While such coating may be formed in various ways, I prefer to form the coating by dissolving abietic acid in alcohol and adding a small amount of an ester of the abietic acid, together with oleic acid and benzoic acid. The solution so formed is preferably sprayed on the tablets by means of an atomizer operated by compressed air while the pills or tablets are rolling in a revolving pan of the type ordinarily used in coating pills or tablets. It will be understood, however, that the enteric coating may be formed in any other desired manner as, for example, by dipping the pills or tablets or by forming in the shape of a film or capsule adapted to contain the tablet. When sprayed upon the tablets as described above, the coating has ample mechanical strength, moisture resistance, etc., to withstand ordinary shipment and storage conditions over a long period of time without deterioration or disintegration, and also has the desired chemical properties of conveying the tablet coated thereby through the stomach and into the intestines before dissolving.

In preparing the enteric coating for application to tablets, I dissolve 10 lbs. of abietic acid in 3 gallons of 95% alcohol and add to this solution 3 ounces of methyl abietate, 1 pint of oleic acid and 12 ounces of benzoic acid. While specific figures have been given, it will be understood that modifications in proportions may be resorted to without departing from the spirit of my invention.

In applying the coating from a solution so formed, the tablets are preferably first coated with any convenient sub-coating in order to present a smooth surface for application of the enteric coating. The enteric coating is then sprayed upon the tablets while the tablets are rolling in a revolving pan and the alcohol is readily evaporated, leaving the enteric coating smoothly and uniformly applied to the surface of the tablet. The protective sugar or gelatine coating is then placed on to finish the tablet and the tablets bottled or boxed for shipment and sale.

While I am aware that various materials have been proposed and used as enteric coatings, I have found that the coating described above is more satisfactory than other enteric coatings known to me both because of the ready accomplishment of the desired purpose of conveying the tablet, pill or the like, through the stomach untouched by the acids and gastric juices of the stomach and into the intestines where the coating is readily disintegrated by the slightly alkaline content of the intestines and because the coating introduces no undesirable physiological activity and no undesirable materials into the intestines.

I claim:

1. An enteric coating for pills, tablets or the like, consisting principally of abietic acid, together with a small amount of a fatty acid as a plasticizer.

2. An enteric coating for pills, tablets or the like, consisting principally of abietic acid to which has been mixed a small amount of an ester of abietic acid and a small amount of a fatty acid, as a plasticizer.

3. An enteric coating for pills, tablets or the like, consisting principally of abietic acid to which has been added a small amount of an ester of abietic acid together with oleic acid and benzoic acid.

4. An enteric coating for pills, tablets or the like, consisting of abietic acid, an ester of abietic acid, oleic acid and benzoic acid in approximately the proportions of 10 lbs. of abietic acid to 3 ounces of methyl abietate, 1 pint of oleic acid and 12 ounces of benzoic acid.

5. The method of applying enteric coatings to pills, tablets or the like, which comprises dissolving abietic acid and a suitable plasticizer therefor in alcohol in substantially the proportions of 10 lbs. of abietic acid to 3 gallons of alcohol, 3 ounces of an ester of abietic acid, 1 pint of oleic acid and 12 ounces of benzoic acid, and spraying the enteric coating in the alcohol solution on the tablets to be coated.

6. As an article of manufacture a pill, tablet or the like having an enteric coating thereon, consisting principally of abietic acid together with an ester of abietic acid and a fatty acid of a plasticizing nature.

FRANK R. ELDRED.